United States Patent

[11] 3,620,709

| [72] | Inventors | John M. Petkovsek<br>Snyder, Tex.;<br>Carlos O. Rodriguez, Sunnyvale, Calif. |
|---|---|---|
| [21] | Appl. No. | 820,295 |
| [22] | Filed | Apr. 29, 1969 |
| [45] | Patented | Nov. 16, 1971 |
| [73] | Assignee | International Minerals & Chemical Corporation |

[54] GRANULATION OF POTASSIUM SULPHATE
6 Claims, No Drawings

[52] U.S. Cl. ................................................ 71/63,
23/313, 71/64, 264/117
[51] Int. Cl. ........................................ B01j 2/12
[50] Field of Search .......................... 264/117;
71/64 D, 64 DA, 63; 23/313

[56] References Cited
UNITED STATES PATENTS

| 2,107,701 | 2/1938 | Hasse et al. ................... | 71/63 |
| 2,107,702 | 2/1938 | Hasse et al. ................... | 71/64 DA |
| 3,161,707 | 12/1964 | Stirling ......................... | 264/117 |
| 3,406,426 | 10/1968 | Probst, Jr. et al. ............ | 264/117 |

OTHER REFERENCES

" Agglomeration," Chemical Engineering magazine, Oct. 1951, pp. 161–164

*Primary Examiner*—Robert F. White
*Assistant Examiner*—J. R. Hall
*Attorneys*—James E. Wolber and Peter Andress

ABSTRACT: Potassium sulfate particles are wetted with an aqueous solution containing magnesium sulphate, potassium sulfate and starch and are granulated to form stable granules.

GRANULATION OF POTASSIUM SULPHATE

This invention relates to the granulation of a fertilizer component, and more particularly to the granulation of potassium sulfate.

It is frequently desirable that fertilizer ingredients be provided in granulated form rather than as finely divided particulate solids. Finely divided solids tend to dust during handling and may tend to clog application equipment that frequently is designed to handle only granulated material.

Granulation of fertilizer components is known to the art and is disclosed, inter alia, in U.S. Pat. No. 2,107,701 and 2,107,702. Finely divided solids may be tumbled in a disc or drum-type granulator in the presence of a binder which can be water or an aqueous solution or suspension of substance that acts as an adhesive to coalesce the particulate solids into granules. Following the tumbling operation the granules may be dried, if desired.

Inasmuch as fertilizer components are bulk materials, stringent economic standards restrict severely the choice of binders. Moreover, in order to maintain the grade of the fertilizer mineral it is often desirable that the fertilizer granule contain only a minimum of foreign binder. Finally, the fertilizer granule must properly release the fertilizer values when applied to the ground. Economic and produce grade and performance considerations so severely limit the field of choice that the economic manufacture of stable granules continues to present a meaningful technical challenge.

It is one object of this invention to provide stable potassium sulfate granules.

It is also an object of this invention to provide stable potassium sulfate granules in which the nutrient release characteristics of the potassium sulfate are not substantially altered.

It is another object of this invention to provide a method of economically producing stable potassium sulfate granules.

It is an additional object of this invention to provide a method of producing stable potassium sulfate granules that maintains product grade dilution to a minimum.

In accordance with this invention it has been determined that superior potassium sulfate granules may be obtained by wetting finely divided potassium sulfate with an aqueous solution containing potassium sulfate, magnesium sulfate and starch, granulating the wetted potassium sulfate particles and drying the granulated particles.

The process of this invention provides granules having the desired stability and maintains reduction of product grade to a minimum. The potassium sulfate component of the binder solution obviously does not reduce product grade. Indeed, the potassium sulfate of the binder becomes part of the product that is useful to the purchaser and is calculated in the sale price of the fertilizer since it represents $K_2O$ values. While the magnesium sulfate does reduce the product grade slightly, the sulfate moiety of the magnesium salt is common with the sulfate of the potassium sulfate. Potassium sulfate produced by the metathetical reaction between potassium chloride and langbeinite may produce potassium sulfate fines having a grade as low as 50.5 percent $tLK_2O$. Inasmuch as commercial specifications require 50 percent $K_2O$ products, it is apparent that, in these instances, the binder must be selected to avoid any substantial product grade reduction.

It appears that the magnesium sulfate and potassium sulfate of the binder solution in some manner form a complex salt that significantly enhances the strength of the granules. Neither magnesium sulfate alone or potassium sulfate alone provide granulated products comparable to those provided when the binder solution contains both magnesium sulfate and potassium sulfate.

The aqueous binder solution of the present invention will contain from about 1 to about 15 percent magnesium sulfate from about 1 to about 15 percent potassium sulfate and from about 1 to about 5 percent starch. In a preferred embodiment the aqueous solution will contain from about 2.5 to about 6 percent magnesium sulfate, from about 2 to about 12 percent potassium sulfate and from about 2.5 to about 3.5 percent starch, and in another preferred embodiment the aqueous solution will contain from about 3 to about 6 percent magnesium sulfate, from about 6 to about 9 percent potassium sulfate and from about 2.5 to about 3.5 percent starch. All percentages are by weight.

The potassium sulfate and magnesium sulfate for the binder solution are, of course, standard articles of commerce. In addition both can be obtained readily by dissolving langbeinite ($K_2SO_4$) with the use of additional potassium sulfate if desired. Indeed, as one embodiment of this invention it is contemplated that the potassium sulfate and magnesium sulfate values of the binder solution will be obtained essentially from langbeinite. The starch employed in the solution is commercially available and may be, for example, a gelatinized starch such as wheat starch, potato starch, corn starch, maize starch and the like. Boiled corn starch is particularly suitable for the binders of this invention.

The aqueous binder solution is applied to the potassium sulfate particles in suitable amount. The amount to be applied in each instance is within the skill of the routineer and often ranges between about 8 and about 11 percent water. Generally less liquid can be used when the binder solution is more concentrated. On the other hand, larger granules tend to require more binder solution as does a granulator feed of hot potassium sulfate. In the latter event the feed will be cooled through vaporization of water. The temperature of the potassium sulfate feed can range from ambient to about 250° C.

The method of applying the solution to the potassium sulfate particles and the granulation are not critical to the practice of this invention. This solution can be preblended with the potassium sulfate in, for example, a pug mixer. Alternatively the binder solution can be sprayed on the potassium sulfate particles in the granulator itself. As noted earlier, granulation equipment is known to the art. Granulation can be carried out, for example, in a disc granulator or a rotating drum granulator. Each has the effect of tumbling the particles to form granules. Such equipment can accept particles prewetted with a binder solution or may include means for spraying binder solutions on the particles while they are being tumbled. The equipment may operate at atmospheric temperature or may include heating means.

After granulation the particles are dried. Once again drying means are known to the art and include, for example, either concurrent or countercurrent driers of the rotating kiln or moving bed variety. Although drying of the granules can be carried out in conventional drying systems care should be taken to avoid unnecessary attrition of the particles particularly while the moisture content of the particles remains above about 3 percent by weight. Similarly, too rapid drying of the green granules should be avoided since this also tends to cause some degradation of the product. Countercurrent driers are particularly suited for this invention although concurrent driers also can be employed. Temperatures of product from countercurrent driers readily may range from 125° to 175° C. while products from concurrent driers may benefit from lower exit temperatures such as 110° C. In a rotary drier a desirable rolling movement can be maintained to furnish a polishing effect of the particles during drying without incurring excessive degradation. Final moisture contents from about 0.85 to about 1 percent are most appropriate to provide stable granules.

Potassium sulfate granules of any normal size can be produced according to the process of this invention. For example, potassium sulfate of −20 mesh and ranging down to fines readily can be granulated and screened to provide granules in the −4 +65 mesh size range. Oversize particles may be ground and together with fines, if any, can be recycled to the process.

If desired, the granules of this invention can be case hardened by surface coating the granules. As one aspect of this invention, it is contemplated that the dried granules be case hardened with the above-described binder solution. The granules, preferably at a temperature of a least about 80° C., are coated with a solution of the binder and then redried to provide a hard surface that still further resists degradation.

The following example is included for illustrative purposes only and is not intended to limit the scope of this invention.

screen size analysis of the feed and dryer discharge were as shown.

TABLE 2

| Run | Binder, percent by wt. | | | Screen analysis, percent | | | | Dryer temp., °F. | Degradation, percent |
|---|---|---|---|---|---|---|---|---|---|
| | MgSO₄ | K₂SO₄ | Starch | Sample | +6 | +20 | +35 | | |
| 1 | 4.6 | 3.7 | 3 | Feed | 0.2 | 15.2 | 34.0 | 221 | 16.4 |
| | | | | Product | 22.6 | 74.0 | 85.6 | | |
| 2 | 4.6 | 3.7 | 3 | Feed | 0.2 | 12.6 | 29.4 | 270 | 9.8 |
| | | | | Product | 42.4 | 80.4 | 87.8 | | |
| 3 | 5.2 | 3.8 | | Feed | 0.8 | 14.4 | 70.8 | 250 | 46.0 |
| | | | | Product | 16.8 | 71.4 | 78.2 | | |
| 4 | | | | Feed | 0.8 | 14.4 | 27.0 | 250 | 51.8 |
| | | | | Product | 11.0 | 68.4 | 79.4 | | |

EXAMPLE I

Potassium sulfate granules of −20 mesh ranging down to fines were wetted with the binder solutions indicated below by spraying the particles with the solution while the particles were being tumbled in a drum granulator. The solution was applied to provide a moisture content of about 10 percent as water. After granulation the particles were dried in a 14 × 8 rotary drier operating at 7 r.p.m. The product was discharged at a temperature of about 150° C. and a moisture content of just below 1 percent.

Table 1 demonstrates the effect of varying proportions of binder solution on the degradation of the product in the drier. A test with starch demonstrates that starch alone is not an effective binder. Potato starch was employed in runs 1–4 and 7 of table 1 while pearl corn starch was employed in runs 5 and 6.

Product degradation was determined by placing 500 grams of a very narrow size fraction of product, generally −8 +10 mesh, in a jar mill together with two steel bars ½ inches in diameter and 5½ inches long. The mill was operated for 5 minutes, and percent degradation is the percent by weight of material which falls outside the specified narrow range, i.e., which will pass a 10 mesh sieve.

TABLE 1

| | Binder | | | Product Degradation |
|---|---|---|---|---|
| | % by weight | | | |
| | MgSO₄ | K₂SO₄ | Starch | % |
| 1. | 13 | 9.3 | 2 | 21 |
| 2. | 13 | 9.3 | 1 | 20 |
| 3. | 7.3 | 5.3 | 2 | 33 |
| 4. | 7.3 | 5.3 | 1 | 31 |
| 5. | 13 | 9.3 | 2 | 16 |
| 6. | 13 | 9.3 | 1 | 21 |
| 7. | | | 2 | 51 |

EXAMPLE II

Example I was repeated using the binder solutions and conditions set forth in table 2. Dryer operation was in countercurrent direction. Gelatinized corn starch was employed. The

EXAMPLE III

Potassium sulfate of −20 mesh ranging down to fines were wetted in a pug mill with the binder solutions shown in table 3. The wetted material was then passed through a drum granulator. The weight of liquid added (binder solution) amounted to 7.5 to 8.5 percent by weight of the potassium sulfate feed. After granulation the product was dried in a 3 foot diameter by 30 feet long rotary dryer, fired for either concurrent or countercurrent flow, as indicated. Moisture content of the dryer discharge was about 1 percent.

The starch employed was gelatinized corn starch. The dryer discharge was screened to separate a −6 +20 product fraction. The oversize was crushed and combined with the undersize for recycle as input to the pug mill. Test results are as indicated in table 3.

TABLE 3

| Run No. | Binder, percent by wt. | | | Dryer discharge temp., °F. | Product temp., °F. | Degradation, percent | Recycle, percent of product |
|---|---|---|---|---|---|---|---|
| | MgSO₄ | K₂SO₄ | Starch | | | | |
| Concurrent dryer operation | | | | | | | |
| 1 | 2.7 | 11 | 3.5 | 450 | 220 | 14.8 | 150 |
| Countercurrent dryer operation | | | | | | | |
| 2 | 2.7 | 11 | 3.5 | 290 | 184 | 14.0 | 220 |
| 3 | 2.7 | 11 | 3.5 | 285 | 204 | 13.2 | 210 |

We claim:

1. A method of forming granules of potassium sulfate which comprises wetting finely divided potassium sulfate particles with an aqueous solution containing from about 1 to about 15 percent magnesium sulfate, from about 1 to about 15 percent potassium sulfate and from about 1 to about 5 percent starch, tumbling the wetted potassium sulfate particles to form granules and drying the granules.

2. The method of claim 1 wherein the binder solution contains from about 2.5 to about 6 percent magnesium sulfate and from about 2 to about 12 percent potassium sulfate.

3. The method of claim 1 wherein the binder solution contains from about 2.5 to about 6 percent magnesium sulfate, from about 6 to about 9 percent potassium sulfate and from about 2.5 to about 3.5 percent starch.

4. The method of claim 1 wherein the aqueous solution is prepared by dissolving langbeinite in an aqueous liquid.

5. The method according to claim 1 wherein the granules are case hardened after drying by an application of a binder solution containing from about 1 to about 15 percent magnesium sulfate, from about 1 to about 12 percent potassium sulfate and from about 1 to about 5 percent starch and dried.

6. Potassium sulfate granules produced according to the method of claim 1.

* * * * *

PO-1050
(5/69)

UNITED STATES PATENT OFFICE
CERTIFICATE OF CORRECTION

Patent No. 3,620,709  Dated November 16, 1971

Inventor(s) John M. Petkovsek and Carlos O. Rodriguez

It is certified that error appears in the above-identified patent and that said Letters Patent are hereby corrected as shown below:

Column 1, line 12, "2,207,702" should read -- 2,107,702 --; column 1, line 24, "produce" should read -- product --; column 1, line 57, "tLK$_2$O" should read --K$_2$O --. Column 2, line 8, the formula "(K$_2$SO$_{44}$)" should read --(K$_2$SO$_4 \cdot$2MgSO$_4$) --; column 2, line 73, the second occurence of "a" should read -- at --. Column 3, line 20, "14 x 8" should read -- 14" x 8' --.

Signed and sealed this 30th day of May 1972.

(SEAL)
Attest:

EDWARD M. FLETCHER, JR.
Attesting Officer

ROBERT GOTTSCHALK
Commissioner of Patents